D. C. STOVER.
WINDMILL.

No. 193,354.  Patented July 24, 1877.

Witnesses:
Heinrich F. Bruns
O. W. Bond

Inventor:
Daniel C. Stover

UNITED STATES PATENT OFFICE.

DANIEL C. STOVER, OF FREEPORT, ILLINOIS.

IMPROVEMENT IN WINDMILLS.

Specification forming part of Letters Patent No. 193,354, dated July 24, 1877; application filed April 14, 1877.

*To all whom it may concern:*

Be it known that I, DANIEL C. STOVER, of Freeport, Stephenson county, State of Illinois, have invented new and useful Improvements in Windmills, of which the following is a full description, reference being had to the accompanying drawings, in which—

Figure 1:
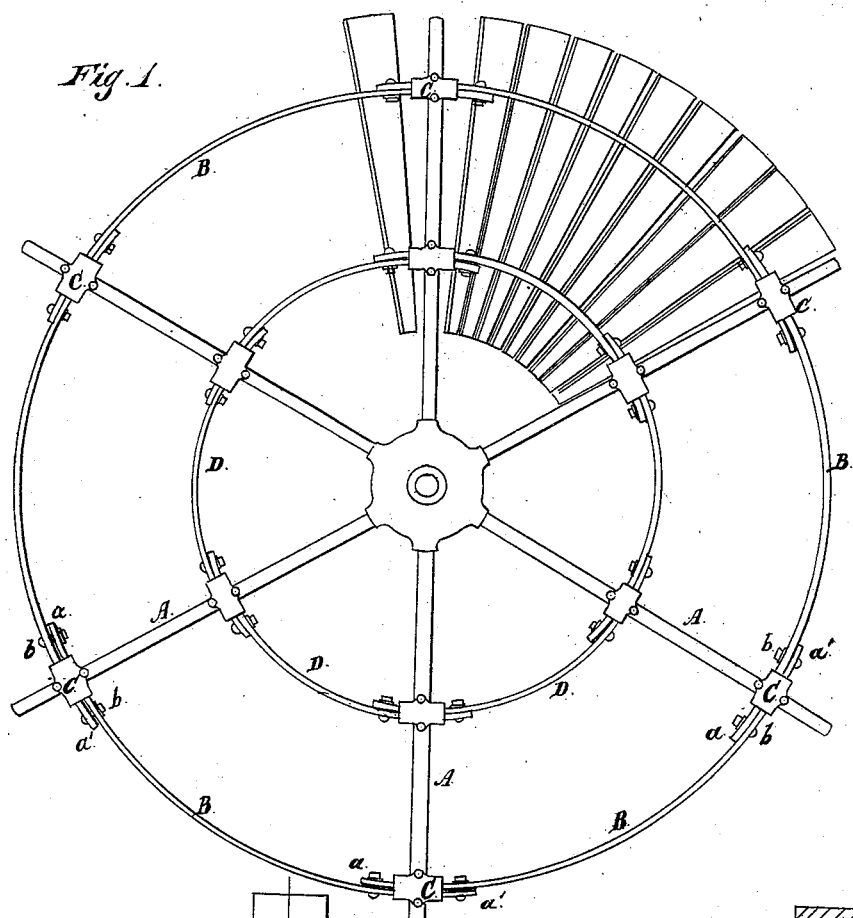
Figure 2:
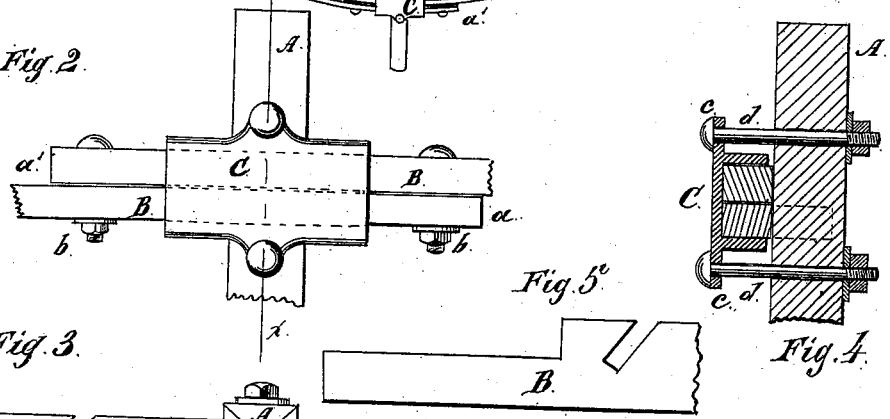
Figure 3:
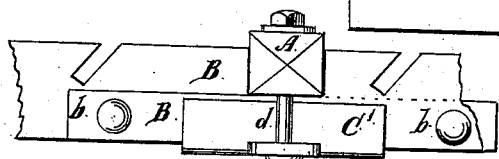
Figure 4:
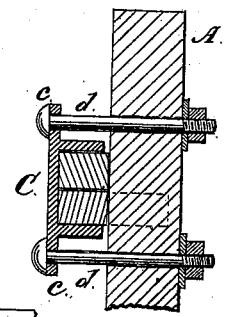

Figure 1 is an elevation, representing the back side of a windmill, a portion only of the slats being shown; Figs. 2, 3, and 4, enlarged details, Fig. 2 being an elevation, representing the joint which I use for connecting the several sections of the wheel, Fig. 3 being a side view of the same, and Fig. 4 being a section, at $x$, of Fig. 2.

My improvement relates to that class of wind-wheels in which the several sections are rigidly secured to the arms.

It is customary to bolt the ends of the several piece which form the rim of the wheel directly to the arms. With this construction the joints are liable to become loose and the several sections to yield in consequence of the pressure of the wind.

The object of my invention is to overcome this objection, which I accomplish by lapping the ends of the several pieces which form the rim, and bolting them together; also, by providing a metal cap bolted to the arm, as more fully hereinafter described.

Figure 5:
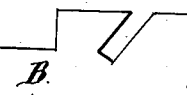

In the drawings, A represents the arms of the several sections, which at their inner ends are secured in a hub, in the usual manner. B are the several pieces which form the rim of the wheel. They are made of such length that their ends overlap each other, passing some distance beyond the arms, as represented at $a$ $a'$, and these overlapping ends are secured together by means of bolts $b\ b$. The overlapping ends are cut away, as represented in Fig. 5. The rim is secured to the arms by means of a metal cap, C, which is provided with flanges $c$, fitting over the lapped portions of the rim. This cap is provided upon each side with a projection or ear, and by means of this cap and the bolts $d$, which pass through the arms A, the rim is secured to the arms.

I thus provide a very strong joint and increase the strength of the wheel.

D represents the several parts which form the inner rim, in which one end of the slats are secured. This rim may be made and secured in the same manner as the outer rim.

What I claim as new, and desire to secure by Letters Patent, is as follows:

1. In a windmill, the rim B, formed of pieces having overlapping ends $a\ a'$, secured together by means of bolts $b$, in combination with the arms A, substantially as and for the purposes specified.

2. The arms A and rim B, formed of pieces having overlapping ends, in combination with the cap C, substantially as and for the purposes described.

DANIEL C. STOVER.

Witnesses:
O. W. BOND,
L. L. BOND.